United States Patent
Furukawa et al.

[11] Patent Number: 5,932,310
[45] Date of Patent: Aug. 3, 1999

[54] MAGNETIC ELEMENT AND PROCESS FOR PRODUCING THE SAME

[75] Inventors: Shinji Furukawa; Nobuyoshi Yano, both of Kyoto, Japan

[73] Assignee: Unitika Ltd., Hyogo, Japan

[21] Appl. No.: 08/808,545

[22] Filed: Feb. 28, 1997

[30] Foreign Application Priority Data

Feb. 28, 1996 [JP] Japan .................................. 8-040955

[51] Int. Cl.$^6$ .............................. G11B 3/00; B32B 7/00
[52] U.S. Cl. ........................ 428/98; 428/213; 428/216; 428/221; 428/692; 340/551; 340/572; 204/192.2; 324/252; 338/32 R; 283/82
[58] Field of Search ............................ 428/98, 213, 216, 428/221, 692; 340/551, 572; 204/192.2; 324/252; 338/32 R; 283/82

[56] References Cited

U.S. PATENT DOCUMENTS

| | | | |
|---|---|---|---|
| 4,940,966 | 7/1990 | Pettigrew et al. | 340/551 |
| 4,960,651 | 10/1990 | Pettigrew et al. | 428/607 |
| 4,967,185 | 10/1990 | Montean | 340/572 |
| 5,401,584 | 3/1995 | Minasy et al. | 428/611 |
| 5,580,664 | 12/1996 | Tsai | 428/457 |

FOREIGN PATENT DOCUMENTS

0604293  6/1994  European Pat. Off. .
WO-9207343  4/1992  WIPO .

OTHER PUBLICATIONS

Journal of Applied Physics, vol. 75, No. 10, Part 10, Part 02B, May 15, 1994, pp. 6997–6999 Farrell G.P. et al: "Barkhausen Transitions in Single Layer and Bilayer Thin Permalloy Films".

*Primary Examiner*—Stevan A. Resan
*Attorney, Agent, or Firm*—Sughrue, Mion, Zinn, Macpeak & Seas, PLLC

[57] ABSTRACT

A magnetic element comprising a first thin film and a second thin film having a coercive force that is greater than the coercive force of the first thin film formed on a substrate. The magnetic element exhibits a continuous magnetic reversal under an applied alternating magnetic field having a magnitude that is smaller than the coercive force of the second thin film to cause said first thin film to undergo magnetic reversal. The magnetic element also exhibits a discontinuous sudden magnetic reversal under an applied alternating magnetic field having a magnitude that is greater than the coercive force of the second thin film. The configuration of the magnetic element has little effect on discontinuous magnetization response. Thus the magnetic element exhibits good magnetic characteristics even when formed in a small size.

29 Claims, 5 Drawing Sheets

MAGNETIC ELEMENT AND PROCESS FOR PRODUCING THE SAME

BACKGROUND OF THE INVENTION

1. Field of the Invention

The present invention relates to a magnetic element which exhibits a rapid charge in magnetization with a change in an externally applied magnetic field, and a process for producing the same.

2. Description of the Related Art

There are many devices which utilize the magnetization behavior of a magnetic material. In addition to devices which exhibit a continuous response to a change in an external magnetic field such as a magnetic induction type magnetic head, magnetic elements made of a magnetic material which exhibit a sudden magnetic reversal and a discontinuous response when the intensity of the applied magnetic field exceeds a predetermined value have recently been employed. When a pickup coil is disposed in the vicinity of such a magnetic material, a steep voltage pulse can be produced in the coil upon a discontinuous magnetic reversal of the magnetic material. The use of such a magnetic element can provide a simplified apparatus which is widely applicable to the measurement of magnetic fields such as the earth's magnetic field, rotational speed, flow rate, etc.

Furthermore, in recent years, electronic article surveillance systems or identification systems for preventing the theft of merchandise or for rapidly processing the flow of materials have become more widely used. These devices employ identifying markers such as an oscillation circuit, an LC resonance circuit, a magnetostrictive vibrating material and a high magnetic permeability material, as well as the above-describe magnetic material which exhibits a discontinuous magnetic reversal. For example, U.S. Pat. Nos. 4,660,025, 4,686,516 and 4,797,658 disclose a system employing a marker made of a fine amorphous Fe based alloy wire. The magnetization of the foregoing fine metal wire material is extremely stable in the longitudinal direction and thus exhibits a very sudden 180° magnetic reversal when the magnetic field reaches a predetermined magnitude. This characteristic is called a large Barkhausen discontinuity. When the intensity of an alternating magnetic field which has been transmitted as an inquiry signal in a monitor zone reaches a critical value, the fine metal wire exhibits a discontinuous magnetic reversal, thereby causing a detection coil to produce a steep pulse voltage. The waveform of the pulse voltage thus produced is then subjected to a frequency analysis in which the intensity and proportion of high harmonics are determined to identify the marker or to judge if it is necessary to sound an alarm. This system is advantageous in that the marker is inexpensive and provides an identifying capacity higher than that of other systems.

Magnetic materials have been found which exhibit a discontinuous magnetization response besides the foregoing fine amorphous metal wire. For example, U.S. Pat. Nos. 4,980,670 and 5,313,192 disclose a material obtained by subjecting a slender amorphous metal ribbon to heat treatment in a magnetic field. Furthermore, U.S. Pat. No. 5,181,020 discloses a thin film having a strong uniaxial magnetic anisotropy formed on a polymer substrate such as a plastic film which exhibits a discontinuous magnetic reversal. This material exhibits excellent square hysteresis characteristics similar to the fine metal wire.

The thin film disclosed in the above-cited U.S. Pat. No. 5,181,020 provides a steep discontinuous magnetization response similar to a fine amorphous metal wire when it is formed into a slender shape, e.g., 1 mm wide×50 mm long×0.5 $\mu$m thick, along the direction of magnetic easy axis. However, these thin films are disadvantageous in that they are strongly affected by a demagnetizing field. Thus, these thin films exhibit remarkably deteriorated magnetic characteristics when they are formed into a shorter, wider and thicker shape. In recent years, there has been a great demand for miniaturized sensors or magnetic markers for preventing theft. However, these materials cannot adequately meet this demand.

SUMMARY OF THE INVENTION

It is therefore an object of the present invention to provide a magnetic element which having good magnetic characteristics even when formed in a small size, and a process for easily producing the same.

The present invention solves the above described problems of the conventional art. That is, in a first embodiment of the present invention provides a magnetic element comprising a first thin film and a second thin film having a coercive force that is greater than the coercive force of said first thin film formed on a substrate, wherein said magnetic element exhibits a continuous magnetic reversal under an applied alternating magnetic field having a magnitude that is smaller than the coercive force of said second thin film to cause said first thin film to undergo magnetic reversal, and said magnetic element exhibits a discontinuous sudden magnetic reversal under an applied alternating magnetic field having a magnitude that is greater than the coercive force of said second thin film.

In a second embodiment of the present invention provides a process for the producing a magnetic element, which comprises providing a substrate having a surface and applying a coating to a part of the substrate surface, and then depositing a thin film thereon to form a first thin film on an uncoated part of said substrate and a second thin film having a coercive force that is greater than that of said first thin film on a coated part of said substrate.

The configuration of the magnetic element of the present invention has little effect on discontinuous magnetization response. Therefore, the magnetic element of the present invention exhibits good magnetic characteristics even when formed in a small size.

Furthermore, the present invention provides a process for easily producing a small-sized magnetic element which exhibits a discontinuous magnetization response.

DESCRIPTION OF REFERENCE NUMERALS

1 . . . Magnetic element
2 . . . First thin film
3 . . . Second thin film

DETAILED DESCRIPTION OF THE INVENTION

The present invention is described in greater detail below and in reference to the drawings.

First, the magnetic element according to a first embodiment of the present invention is described below.

The magnetic element of the present invention comprises first and second thin films each having a different coercive force formed on a substrate. More particularly, the magnetic element comprises a first thin film and a second thin film having a greater coercive force-that is greater than that of the first thin film.

Figure 1:
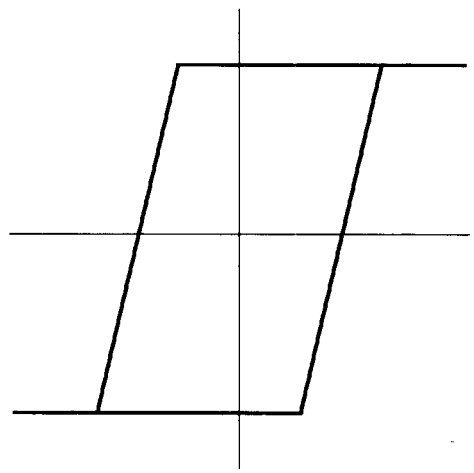
FIG. 1 is a diagram illustrating the hysteresis loop of a first thin film for use in the magnetic element of the present invention.
Figure 2:
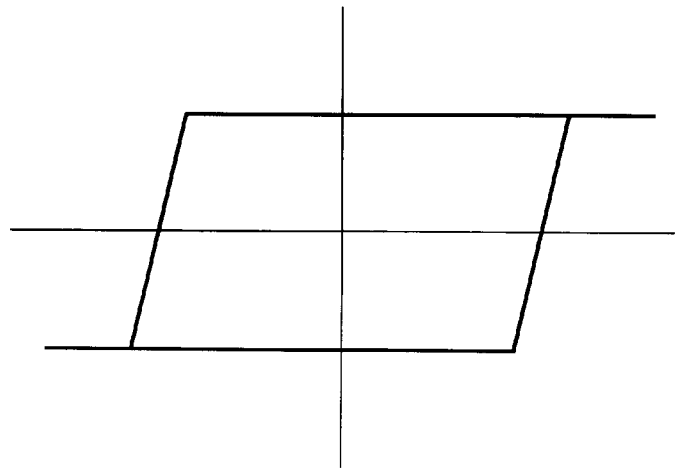
FIG. 2 is a diagram illustrating the hysteresis loop of a second thin film for use in the magnetic element of the present invention.

FIGS. 1 and 2 are schematic diagrams illustrating the hysteresis loop of the first and second thin films for use in the magnetic element of the present invention, respectively. These figures also show that the second thin film has a greater coercive force than that of the first thin film.

In the magnetic element of the present invention in which these thin films are combined, the first and second thin films effect each other. Accordingly, characteristics which differ from an ordinary two-step loop are observed in the magnetic element of the present invention.

Figure 3:
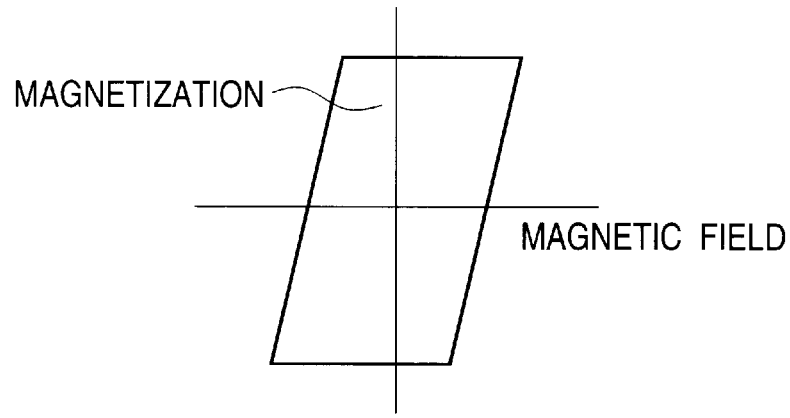
FIG. 3 is a diagram illustrating the hysteresis loop of a magnetic element of the present invention under an applied magnetic field having a magnitude that is smaller than the coercive force of the second thin film.

First, as shown in FIG. 3, the hysteresis loop of the magnetic element of the present invention that is developed when the magnitude of an alternating magnetic field applied thereto is smaller than the coercive force of the second thin film allows only the first thin film to undergo magnetic reversal. More particularly, as shown in FIG. 3, when the magnitude of the alternating magnetic field applied to the magnetic element is smaller than the coercive force of the second thin film to thereby allow the first thin film to undergo magnetic reversal, the magnetic element shows substantially the same continuous magnetic reversal as in FIG. 1.

Figure 4:
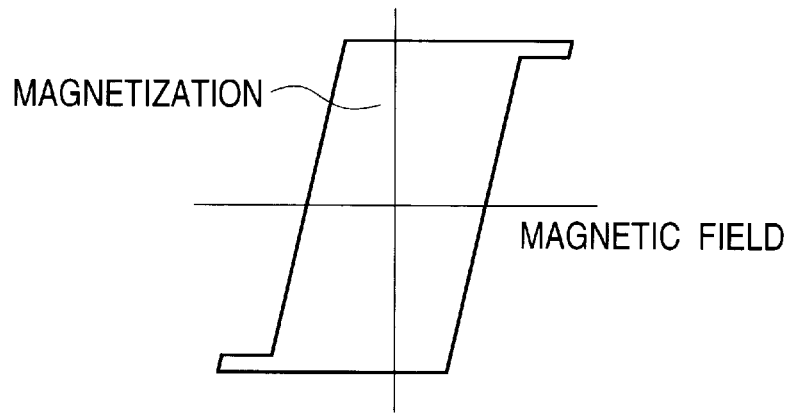
FIG. 4 is a diagram illustrating the hysteresis loop of a magnetic element of the present invention under an applied magnetic field having a magnitude that is greater than the coercive force of the second thin film.
Figure 5:
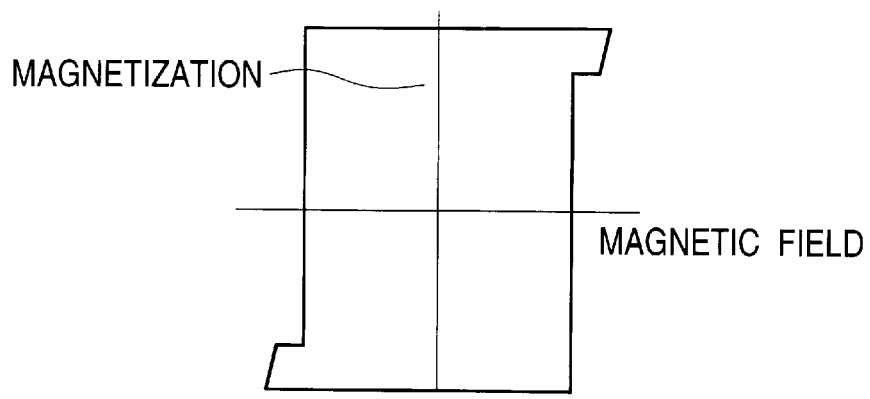
FIG. 5 is a diagram illustrating the hysteresis loop of a magnetic element of the present invention under an applied magnetic field having a magnitude that is greater than that applied in FIG. 4.

When the magnitude of the alternating magnetic field applied to the magnetic element increases to an extent such that it is greater than the coercive force of the second thin film, the second thin film also begins to undergo magnetic reversal. The hysteresis loop of the magnetic element in this state is as schematically shown in FIG. 4. When the magnetic reversal developed in the second thin film reaches a particular level, the entire magnetic element suddenly exhibits a discontinuous sudden magnetic reversal as shown in FIG. 5.

The occurrence of such a discontinuous sudden magnetic reversal is attributed to the mutual interaction of the two thin films in the magnetic element of the present invention. This phenomenon is confirmed by observing the magnetization process of the magnetic element under applied magnetic fields of various magnitude.

In order to allow the magnetic element of the present invention to undergo a discontinuous sudden magnetic reversal, the first and second thin films desirably should each have uniaxial magnetic anisotropy. The two thin films more preferably have the same direction of ease of magnetization.

Figure 6:
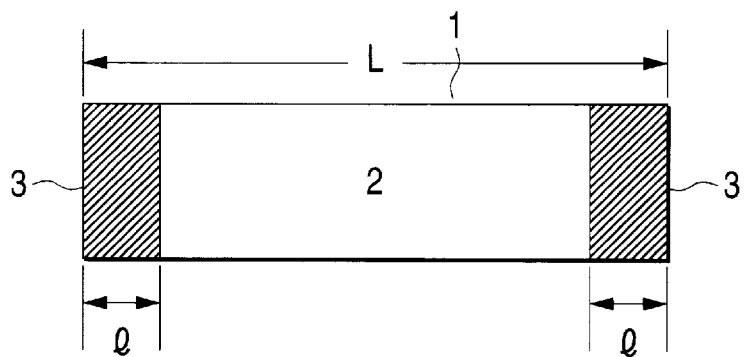
FIG. 6 is a diagram illustrating an example of the configuration of the first and second thin films in the magnetic element of the present invention.

With regard to the arrangement of the first and second thin films in the magnetic element of the present invention, the configuration shown in FIG. 6 in which the second thin film 3 is disposed in such manner that it is juxtaposed to both ends of the first thin film 2 is desirable. Alternatively, in a preferred embodiment, the first thin film 2 is surrounded by the second thin film 3 in a frame-shaped pattern as shown in FIG. 7.

Referring to the dimension of the magnetic element, the structure of FIG. 6 is preferably such that the length (l) of the second thin film 3 is not less than 5%, more preferably not less than 10%, of the total length (L) of the magnetic element 1 in the lengthwise direction (substantially the direction of magnetic easy axis) of the magnetic element 1.

Figure 7:
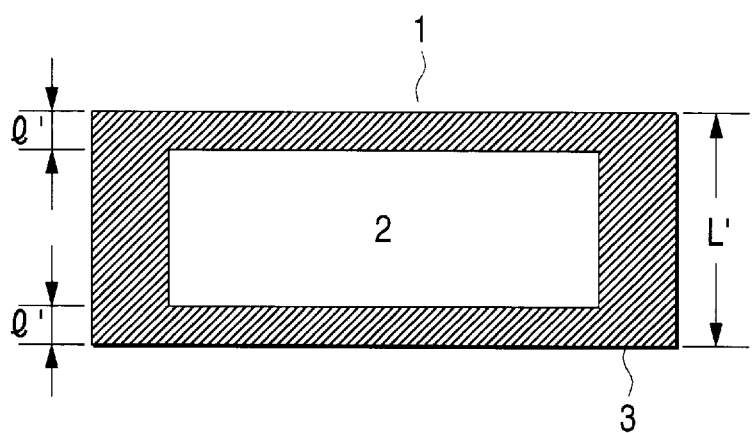
FIG. 7 is a diagram illustrating another example of the configuration of the first and second thin films in the magnetic element of the present invention.
Figure 8:
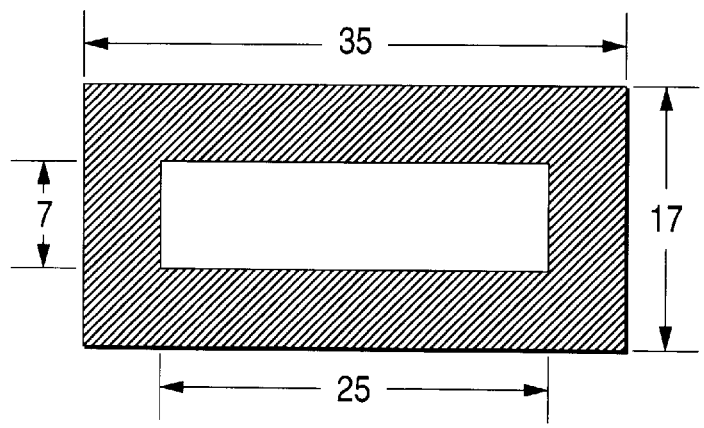
FIG. 8 is a diagram illustrating a printed pattern of an aqueous ink applied to the substrate in Example 1.

The structure shown in FIG. 7 is preferably such that the width (l') of the second thin film 3 is not less than 5%, more preferably not less than 10%, of the total width (L') of the magnetic element 1 in the central portion of the magnetic element 1 in the crosswise direction (substantially the direction of magnetic hard axis) of the magnetic element 1 in addition to the foregoing dimension.

Furthermore , as discussed above, the magnetic element of the present invention is arranged such that the coercive force of the second thin film is greater than that of the first thin film. The coercive force of the first thin film is preferably not more than 1 Oe. The coercive force of the second thin film is preferably from 0.5 to 2 Oe.

The process for producing the magnetic element of the present invention is described below.

First, a coating is applied to a part of the substrate surface. In this process, care has to be exercised so as not to apply the coating to the entire surface of the substrate.

The coating can be applied to the substrate by any ordinary method such as a screen printing process and a gravure printing process. The coating is preferably printed in a frame-shaped pattern or in a pattern such that a pair of rectangles is disposed apart from each other. The dimension of the pattern may be the same as that of the second thin film.

The coating for use in the present invention is preferably an aqueous coating as opposed to an oil coating for the reason described below.

In addition, as the substrate in the present invention, various materials can be used such as glass, ceramics, metal, polymer and the like. The polymer materials of the examples are preferable. Polyethylene trephthalate (PET), polyethylene naphthalate (PEN), polyarylate (PAR), polycarbonate (PC), Nylon, polypropylene (PP), polyimid and polyether sulfone (PES) is more preferable in the present invention.

Moreover, when a rollcoater in which the substrate is continuously rolled-up by a roll is used, it is preferable that the thickness of the substrate is from 10 to 300 $\mu$m, more preferably, from 20 to 200 $\mu$m. If the thickness exceeds 300 $\mu$m, it may be difficult to roll-up the substrate because of its thickness. If the thickness is less than 10 $\mu$m, the substrate is largely warped by the stress of the thin film formed thereon and/or is difficult to be rolled-up.

On the other hand, the substrate for use in the present invention is not particularly limited. For example, a polymer film such as a polyethylene terephthalate film is preferred.

Subsequently, a thin film is formed on the substrate having thereon the above mentioned coating. The thin film can be formed by ordinary methods such as vacuum metallizing and metal plating. In the present invention, however, a sputtering process is preferred. In particular, the method described in U.S. Pat. No. 5,181,020 which comprises obliquely bombarding thin film-forming particles against a substrate is more desirable. That is because a strong uniaxial magnetic anisotropy is readily induced, to thereby obtain a thin film having good magnetic characteristics.

Examples of the thin film alloy composition that is formed on the substrate in the process of the present invention include crystalline materials such as NiFe, FeAlSi, FeAl and FeSi, extremely fine crystalline materials of Fe or Co alloys including at least one of B, C, N or O, and amorphous materials such as alloys of Fe, Co or Ni including at least one of P, B, C, Zr, Nb, Si, Ti, Ta and Hf.

Here, the thickness of the thin film is preferably from 0.1 to 10 $\mu$m, more preferably, from 0.2 to 5 $\mu$m. If the thickness is less than 0.1 $\mu$m, it is not preferable because the signal emitted when the magnetization is changed from the magnetic element is small. If the thickness exceeds 10 $\mu$m, a small magnetic element is difficult to be obtained because it is required that the shape of the magnetic element is long to obtain sudden magnetic change.

In accordance with the process of the present invention, the two thin films each having a different coercive force can be formed without repeating partial film formation using a mask or the like. That is, by forming a film only once on a substrate to which a coating has been applied in part, a thin film which differs in coercive force from one area to the next is readily obtained. This is because the thin film is affected by the substrate. In other words, the coercive force of the thin film accumulated on the coating that is applied to the substrate is greater than the coercive force of the thin film that is directly disposed on the substrate. In this manner, a second thin film having a greater coercive force can be formed on the coating, while a first thin film having a smaller coercive force than the second thin film can be formed on the substrate on those areas which are free of the coating.

For example, a magnetic element of the present invention may be obtained by a process which comprises applying a coating to a substrate in a pattern such that a pair of rectangles is disposed apart from each other, and forming a thin film on the partly coated substrate. Then, the coated material is cut in such manner that the thin film is terminated by the pair of rectangles at both ends thereof, respectively. In this structure, a first thin film is disposed between two terminal second thin films. Alternatively, the magnetic element may be obtained by a process which comprises forming a thin film on a substrate on which a coating has been printed in a frame-shaped pattern, and then cutting the coated material along the outer edge of the frame-shaped pattern. In this structure, a first thin film is surrounded by a second thin film.

In this manner, a magnetic element of the present invention can be prepared which exhibits a discontinuous sudden magnetic reversal when subjected to an applied magnetic field.

The thin film accumulated on the coating is strongly affected by the coating. For example, a thin film accumulated on an oil coating can easily come off. Thus, a magnetic element prepared with an oil coating can have magnetic characteristics which vary widely over time. For this reason an aqueous coating is preferred to an oil coating for use in the present invention.

Furthermore, the present inventors found that the coercive force of the thin film that is accumulated on the coating depends on the kind of the coating, particularly on the kind and amount of the pigment incorporated into the coating. In other words, when the amount of the pigment incorporated into the coating is increased, the coercive force of the thin film that is accumulated on the coating is increased. Accordingly, if a second thin film which does not have too a great coercive force is desired, then the amount of the pigment incorporated into the coating may be reduced. Generally, the coating contains filler, resin, solvent and the like. For example, as the filler, there is $CaCO_3$, $BaSO_4$, $SiO_2$, $TiO_2$, Carbon, Al, iron oxide or the like. As the resin, an example is cellulose, acrylic resin, polyester, urethane, starch, vinyl chloride, vinyl acetate, polyvinyl alcohol or the like. As the solvent, an example is toluene, hexane, ethyl acetate, MEK (methylethyl ketone), propanol, ethylene glycol mono-butylether or the like.

The thickness of the coating is preferably from 0.1 to 10 $\mu$m, more preferably, from 0.5 to 7 $\mu$m. If the thickness is less than 0.1 $\mu$m, the coercive force of the thin film disposed thereon is nealy equal to that of the thin film directly disposed on the substrate. If the thickness exceeds 10 $\mu$m, it is hard to cause a discoutinuous sudden magnetic reversal becasue the thin film disposed thereon is far from the thin film directly disposed on the substrate.

The coating preferably contains less than 40 weight % of pigment in a dried coating, more preferably, from 3 to 35 weight %. If it exceeds 40 weight %, the surface of the film is made rough and the coercive force become much large. The pigment is not always necessary, and it is possible to adjust the coercive force of the thin film disposed on the coating by a resin or a solid component of an auxiliary agent except the pigment.

In the present invention, the difference in coercive force between the first thin film and the second thin film is preferably from 0.1 to 5 Oe, to thereby cause the magnetic element to undergo a discontinuous sudden magnetic reversal. When the difference in coercive force between the first thin film and the second thin film is not less than 5 Oe, the resulting magnetic element either does not undergo a discontinuous magnetic reversal, or requires an applied magnetic field that is strong. Such an arrangement is no practically useful as a magnetic element. On the other hand, when the difference in coercive force between the first thin film and the second thin film is not more than 0.1 Oe, the resulting magnetic element does not adequately function to undergo a discontinuous magnetic reversal.

Accordingly, the coercive force of the first and second thin films is appropriately controlled to provide a magnetic element of the present invention having superior magnetic characteristics. The coercive force of the second thin film can be controlled by the coating, and particularly by the pigment incorporated therein.

The configuration of the magnetic element of the present invention has little effect on discontinuous magnetization response. As discussed above, the prior art magnetic elements are remarkably sensitive to a demagnetizing field, and thus exhibit remarkably deteriorated characteristics when formed in a wider and shorter shape. Unlike prior art magnetic elements, the magnetic element of the present invention is not so sensitive to dimensional factors. The magnetic element of the present invention can operate even when it is formed in a size of not more than 1 inch. Thus, the magnetic element of the present invention can undergo a discontinuous sudden magnetic reversal even when it is formed in a dimension such that it has a great demagnetizing factor. Therefore, the present invention effectively meets the growing demand for miniaturization of sensors or markers.

EXAMPLE

The present invention will be further described by reference to the following Examples. However, the present invention should not be construed as being limited thereto.

Example 1

An aqueous ink (available from Osaka Printing Ink Mfg. Co., Ltd.) was screen-printed on a 125 μm thick polyethylene terephthalate (PET) film to a thickness of 7 μm in a frame-shaped pattern (short side of outer edge: 17 mm; long side of out edge: 35 mm; short side of inner edge: 7 mm; long side of inner edge: 25 mm). The aqueous ink contains 5 weight % of barium carbonate, 25 weight % of cellulose and 70 weight of ethylene glycol mono-butylether.

Subsequently, using a DC magnetron sputtering apparatus as disclosed in U.S. Pat. No. 5,181,020, an amorphous thin film having the composition $Co_{51}Fe_{26}Si_{10}B_{13}$ (composition given in atm %) was formed on the coated film to a thickness of 0.5 μm. The coated material was then cut along the outer edge of the patterned aqueous ink to produce a magnetic element of the present invention.

In the magnetic element thus obtained, the thin film formed on the PET film on the area free of aqueous ink served as a first thin film, while the thin film formed on the aqueous ink served as a second thin film having a coercive force greater than that of the first thin film.

The magnetic characteristics of the magnetic element thus obtained were then measured at 6 Hz using an AC B-H tracer (AC, BH-100K, available from Riken Denshi Co., Ltd.). Because this magnetic element exhibited a uniaxial magnetic aniosotropy, the magnetic characteristics were measured along the magnetic easy axis. The results are set forth in FIGS. 9 to 12.

Figure 9:
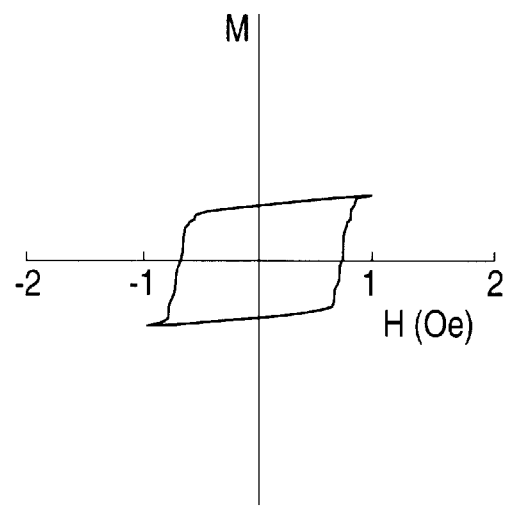
FIG. 9 is a diagram illustrating the hysteresis loop of the magnetic element of Example 1 under an applied magnetic field having a magnitude that is smaller than the coercive force of the second thin film.
Figure 10:
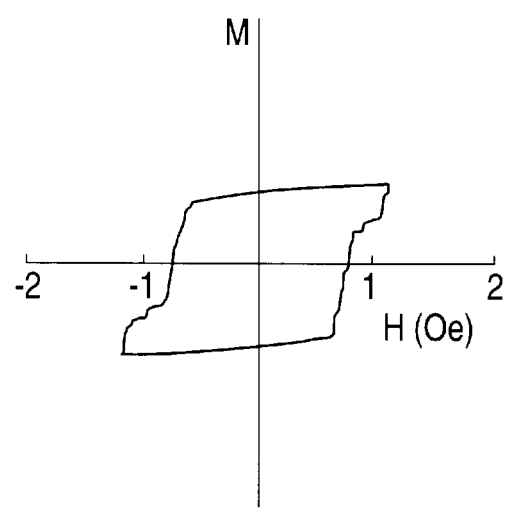
FIG. 10 is a diagram illustrating the hysteresis loop of the magnetic element of Example 1 under an applied magnetic field having a magnitude that is greater than the coercive force of the second thin film.
Figure 11:
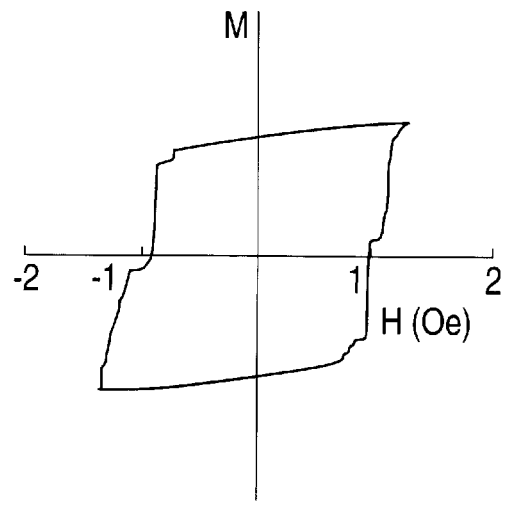
FIGS. 11 and 12 each illustrate the hysteresis loop of the magnetic element of Example 1 under an applied magnetic field having a magnitude that is greater than that of FIG. 10.
Figure 12:
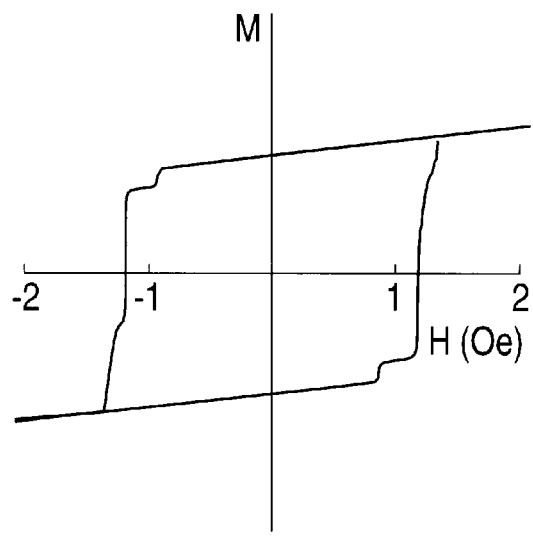

While the magnitude of the alternating magnetic field applied to the magnetic element was smaller than the coercive force of the second thin film so that only the first thin film underwent magnetic reversal, the magnetic element underwent magnetic reversal in a continuous hysteresis loop as shown in FIG. 9. When the magnitude of the alternating magnetic field applied to the magnetic element was greater than the coercive force of the second thin film so that the second thin film also began to undergo magnetic reversal, the magnetization exhibited a stepwise hysteresis loop as shown in FIG. 10. When the magnitude of the magnetic field applied to the magnetic element was further increased, the magnetic element underwent a discontinuous sudden magnetic reversal as shown in FIGS. 11 and 12. Thus, the magnetic element exhibited good magnetic characteristics.

Comparative Example 1

Using the same apparatus as used in Example 1, an amorphous film having the composition $CO_{51}Fe_{26}Si_{10}B_{13}$ (composition given in atm %) was formed on a PET film under the same conditions as in Example 1, except that an aqueous ink was not printed on the PET substrate. Thus, the thin film was directly formed on the entire surface of the PET substrate. The substrate having thereon a thin film was then cut into a rectangle having a short side length of 17 mm and a long side length of 35 mm in such manner that the direction of magnetic easy axis extended in the lengthwise direction.

The magnetic characteristics of the magnetic element thus obtained were then measured in the same manner as in Example 1. The results are set forth in FIG. 13.

Figure 13:
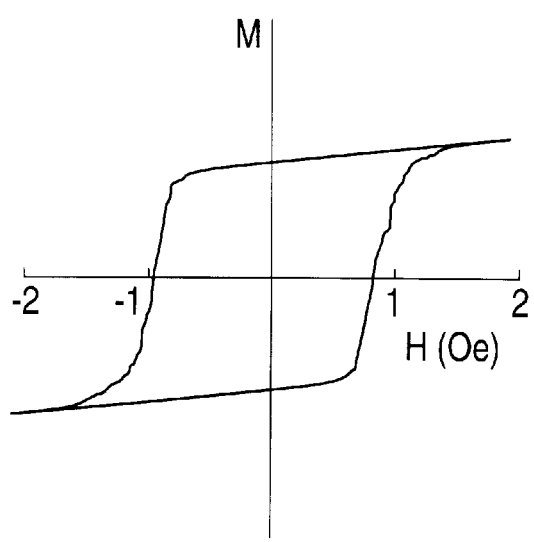
FIG. 13 is a diagram illustrating the hysteresis loop of the magnetic element prepared in Comparative Example 1.

As shown in FIG. 13, even when subjected to an applied magnetic field which was so strong such that the magnetization of the specimen was saturated, the magnetic element exhibited a highly inclined hysteresis loop and a continuous magnetic reversal. Thus, a magnetic element comprising the same thin film but having a uniform coercive force did not produce a sudden magnetic reversal.

It should further apparent to those skilled in the art that various changes in form and detail of the invention as shown and described above may be made. It is intended that such changes be included within the spirit and scope of the claims appended hereto.

What is claimed is:

1. A magnetic element comprising a magnetic thin film including a first part and a second part having a coercive force that is greater than the coercive force of said first part formed on a substrate, wherein said magnetic element exhibits a continuous magnetic reversal under an applied alternating magnetic field having a magnitude that is smaller than the coercive force of said second part to cause said first part to undergo magnetic reversal, said magnetic element exhibits a discontinuous magnetic reversal under an applied alternating magnetic field having a magnitude that is greater than the coercive force of said second part, the difference in coercive force between the first and second parts is from 0.1 to 5 Oe, an the first and second parts have a uniaxial magnetic anisotropy.

2. The magnetic element of claim 1, wherein said first part has first and second ends, and said second part is juxtaposed along the ends of the first part.

3. The magnetic element of claim 2, wherein said second part has a length that is not less than 5% of the total length of the magnetic element in the lengthwise direction.

4. The magnetic element of claim 1, wherein said first part is surrounded by said second part in a frame-shaped pattern.

5. The magnetic element of claim 4, wherein said second part has a length that is not less than 5% of the total length of the magnetic element in the lengthwise direction.

6. The magnetic element of claim 4, wherein said second part has a width that is not less than 5% of the total width of the magnetic element in the central portion of the magnetic element in the crosswire direction.

7. The magnetic element of claim 1, wherein said first and second parts are contiguous.

8. The magnetic element of claim 1, wherein said first part has a coercive force of not more than 1 Oe and said second part has a coercive force of from 0.5 to 2 Oe.

9. The magnetic element of claim 1, further comprising a coating disposed between the second part and the substrate.

10. The magnetic element of claim 1, wherein the first part is formed directly on the substrate and the magnetic element further comprises a coating disposed between the second part and the substrate.

11. The magnetic element of claim 1, wherein said magnetic thin film is a single magnetic thin film.

12. The magnetic element of claim 1, wherein the first and second parts comprise one of a crystalline alloy composition selected from the group consisting of NiFe, FeAl, FeSi and Fe or Co alloys including at least one of B, C, N or O and an amorphous alloy composition selected from the group consisting of alloys of Fe, Co or Ni including at least one of P, B. C, Zr, Nb, Si, Ti, Ta and Hf.

13. A magnetic element comprising a magnetic thin film including a first part and a second part having a coercive force that is greater than the coercive force of said first part formed on a substrate, wherein said first part is formed directly on said substrate and the magnetic element further comprises a coating disposed between the second part and the substrate, said magnetic element exhibits a continuous magnetic reversal under an applied alternating magnetic field having a magnitude that is smaller than the coercive force of said second part to cause said first part to undergo magnetic reversal, said magnetic element exhibits a discontinuous magnetic reversal under an applied alternating magnetic field having a magnitude that is greater than the coercive force of said second part, and wherein the difference in coercive force between the first and second parts is from 0.1 to 5 Oe.

14. The magnetic element of claim 13, wherein said coating is an aqueous coating comprising a pigment and a resin.

15. The magnetic element of claim 13, wherein said first and second parts have a uniaxial magnetic anisotropy.

16. The magnetic element of claim 13, wherein said first and second parts have the same direction of magnetic easy axis.

17. The magnetic element of claim 13, wherein said first part has first and second ends, and said second part is juxtaposed along the ends of the first part.

18. The magnetic element of claim 17, wherein said second part has a length that is not less than 5% of the total length of the magnetic element in the lengthwise direction.

19. The magnetic element of claim 13, wherein said first part is surrounded by said second part in a frame-shaped pattern.

20. The magnetic element of claim 19, wherein said second part has a length that is not less than 5% of the total length of the magnetic element in the lengthwise direction.

21. The magnetic element of claim 19, wherein said second part has a width that is not less than 5% of the total width of the magnetic element in the central portion of the magnetic element in the crosswise direction.

22. The magnetic element of claim 13, wherein said first and second parts are contiguous.

23. The magnetic element of claim 13, wherein said first part has a coercive force of not more than 1 Oe and said second part has a coercive force of from 0.5 to 2 Oe.

24. The magnetic element of claim 13, wherein said first and second parts comprise one of a crystalline alloy composition selected from the group consisting of NeFe, FeAI, FeSi and Fe or Co alloys including at least one of B, C, N or O and an amorphous alloy composition selected from the group consisting of alloys of Fe, Co or Ni including at least one of P, B, C, Zr, Nb, Si, Ti, Ta and Hf.

25. A process for producing a magnetic element, which comprises providing a substrate having a surface and applying a coating to a part of the substrate surface, and then depositing a magnetic thin film thereon to form a first part of the magnetic thin film on an uncoated part of said substrate and a second part of the magnetic thin film having a greater coercive force than that of said first part of the magnetic thin film on a coated part of said substrate, wherein the difference in coercive force between the first part of the magnetic thin film and the second part of the magnetic thin film is from 0.1 to 5 Oe.

26. The process of claim 25 wherein said coating comprises an aqueous coating.

27. The process of claim 26, wherein said coating further comprises a pigment.

28. The process of claim 25, wherein said depositing step comprises sputtering.

29. A magnetic element comprising a magnetic thin film including a first part and a second part having a coercive force that is greater than the coercive force of said first part formed on a substrate, wherein said magnetic element further comprises a coating disposed between the second part and the substrate, said magnetic element exhibits a continuous magnetic reversal under an applied alternating magnetic field having a magnitude that is smaller than the coercive force of said second part to cause said first part to undergo magnetic reversal, said magnetic element exhibits a discontinuous magnetic reversal under an applied alternating magnetic field having a magnitude that is greater than the coercive force of said second part, and wherein the difference in coercive force between the first and second parts is from 0.1 to 5 Oe.

* * * * *